United States Patent
Noh et al.

(10) Patent No.: US 11,423,546 B2
(45) Date of Patent: Aug. 23, 2022

(54) APPARATUS FOR RECOGNIZING OBJECT BASED ON LIDAR SENSOR AND METHOD THEREOF

(71) Applicants: Hyundai Motor Company, Seoul (KR); Kia Motors Corporation, Seoul (KR)

(72) Inventors: Mi Rim Noh, Jeollabuk-do (KR); Ju Heon Baeg, Seoul (KR); Byoung Kwang Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 102 days.

(21) Appl. No.: 17/009,381

(22) Filed: Sep. 1, 2020

(65) Prior Publication Data
US 2021/0312633 A1 Oct. 7, 2021

(30) Foreign Application Priority Data
Apr. 7, 2020 (KR) .................. 10-2020-0042291

(51) Int. Cl.
G06T 7/00 (2017.01)
G06T 7/12 (2017.01)
G06K 9/62 (2022.01)
G01S 17/89 (2020.01)
G06T 7/564 (2017.01)
G06V 10/44 (2022.01)

(52) U.S. Cl.
CPC ............... *G06T 7/12* (2017.01); *G01S 17/89* (2013.01); *G06K 9/6215* (2013.01); *G06T 7/564* (2017.01); *G06V 10/443* (2022.01); *G06T 2207/10028* (2013.01); *G06T 2207/30252* (2013.01)

(58) Field of Classification Search
CPC . G06T 7/12; G06T 7/564; G06T 2207/10028; G06T 2207/30252; G06T 7/10; G01S 17/89; G01S 7/4802; G01S 17/006; G01S 17/02; G06K 9/6215; G06V 10/443; B60W 40/10; B60W 2420/52; G05D 1/0088; G05D 1/0257
See application file for complete search history.

(56) References Cited

U.S. PATENT DOCUMENTS

| | | | | |
|---|---|---|---|---|
| 2019/0180467 A1* | 6/2019 | Ying | .................. | G06T 7/70 |
| 2020/0326703 A1* | 10/2020 | Li | .................. | G05D 1/0088 |
| 2021/0046940 A1* | 2/2021 | Feser | .................. | G06T 7/181 |

* cited by examiner

*Primary Examiner* — Nancy Bitar
*Assistant Examiner* — Xiao Liu
(74) *Attorney, Agent, or Firm* — Fox Rothschild LLP

(57) ABSTRACT

An apparatus for recognizing an object based on a lidar sensor and a method thereof can extract a valid contour point of an object from a point cloud generated by the lidar sensor and recognize a shape of the object based on a contour line composed of the extracted valid contour point of the object, such that it is possible to recognize the shape of an object located on a road with high accuracy, thereby improving the driving stability of an autonomous vehicle. The apparatus includes the lidar sensor that generates the point cloud around an autonomous vehicle, and a controller that extracts the valid contour point of the object from the point cloud and recognizes the shape of the object based on the contour line composed of the extracted valid contour point.

16 Claims, 15 Drawing Sheets

APPARATUS FOR RECOGNIZING OBJECT BASED ON LIDAR SENSOR AND METHOD THEREOF

CROSS-REFERENCE TO RELATED APPLICATION

This application claims the benefit of priority to Korean Patent Application No. 10-2020-0042291, filed in the Korean Intellectual Property Office on Apr. 7, 2020, the entire contents of which are incorporated herein by reference.

BACKGROUND

(a) Technical Field

The present disclosure relates to an apparatus for recognizing an object based on a lidar sensor, more particularly, to a technique for extracting a valid contour point of an object from a point cloud generated from the lidar sensor and recognizing the shape of the object based on the valid contour point.

(b) Description of the Related Art

In general, a point cloud, which is a set of data in a coordinate system, is defined as x, y, and z coordinates in a three-dimensional coordinate system, and typically represents the outer surface of an object.

Such a point cloud may be generated by a 3D light detection and ranging (LiDAR) sensor and the 3D lidar sensor is mounted on an autonomous vehicle and is mainly used to detect surrounding vehicles, lines and various obstacles.

Because the 3D lidar sensor generates a large amount of point clouds in a peripheral area of an autonomous vehicle, an efficient clustering technology is required. As an example, the clustering technology of the point cloud converts a point cloud (three-dimensional point) into a two-dimensional point by projecting the point cloud on a 2D-shaped square grid map, and an 8-neighborhood scheme is applied to two-dimensional points on the converted square grid map.

Because a conventional technique of recognizing the shape of an object from such a point cloud recognizes the shape of an object based on simply a convex hull algorithm, the conventional technique cannot accurately recognize an object of a convex shape in terms of an autonomous vehicle.

For reference, the convex hull algorithm is an algorithm for generating the shape of an object from a point cloud. In particular, the convex hull algorithm generates the shape of an object in such a manner that a point is extracted as a contour point of an object when a point located between two points is located inside the segment connecting the two points (closer to the autonomous vehicle) and not extracted when the point is located outside the segment.

The matters described in this background section are intended to promote an understanding of the background of the disclosure and may include matters that are not already known to those of ordinary skill in in the art.

SUMMARY

An aspect of the present disclosure provides an apparatus for recognizing an object based on a lidar sensor and a method thereof, which can extract an valid contour point of an object from a point cloud generated by the lidar sensor and recognize the shape of the object based on a contour line consisting of the extracted valid contour point of the object, such that it is possible to recognize the shape of an object located on a road with high accuracy, thereby improving the driving stability of an autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for recognizing an object based on a lidar sensor includes the lidar sensor that generates a point cloud around an autonomous vehicle, and a controller that extracts a valid contour point of the object from the point cloud and recognizes a shape of the object based on a contour line composed of the extracted valid contour point.

The controller may set a location of the autonomous vehicle as an origin, set a horizontal line passing through the origin to 0°, divide the point cloud into areas of a first reference angle interval, and extract a point located closest to the origin as a sample point of a corresponding area.

The controller may extract a contour point of the object from extracted sample points based on a distance between the origin and each sample point.

The controller may extract a start point and an end point of the sample points as contour points, generate a first segment connecting the start point and a second sample point located at two sides of a first sample point, generate a second segment connecting the origin and the first sample point, generate an intersection of the first segment and the second segment, and extract the first sample point as the contour point when a length of the second segment does not exceed a length of a segment connecting the origin and the intersection.

The controller may set the sample points located at two sides of the second sample point as the first sample point and a third sample point when the first sample point is extracted as the contour point, and set sample points located on both sides of the second sample point as the start point and the third sample point when the first sample point is not extracted as a contour point, when determining whether to extract the contour point of the second sample point.

The controller may extract the contour point from the sample points based on a distance between the sample points.

The controller may determine a reference distance point as a reference point and extract a sample point located within a reference distance from the reference point as the contour point when a distance between a first contour point and a second contour point exceeds the reference distance.

The controller may extract a sample point located closest to the reference point as the contour point when a plurality of sample points is located within the reference distance from the reference point.

The controller may extract a sample point located closest to the second contour point as the contour point when any sample points located within the reference distance from the reference point do not exist.

The controller may remove the contour point having low validity among all contour points.

The controller may exclude the first contour point and a last contour point among all the contour points from removal targets, and remove a contour point whose distance from a previous contour point does not exceed a minimum distance, as primary filtering.

The controller may remove an end point of a segment among segments sequentially connecting the primarily filtered contour points as secondary filtering, wherein the removed segment has a length within a reference distance, and an angle between the removed segment and a reference segment connecting a first contour point and a last contour point does not exceed a second reference angle.

The controller may repeatedly perform the secondary filtering while increasing the second reference angle each time when a number of valid contour points as a result of the secondary filtering exceeds a reference number.

According to another aspect of the present disclosure, a method of recognizing an object based on a lidar sensor includes generating, by the lidar sensor, a point cloud around an autonomous vehicle, extracting, by a controller, a valid contour point of the object from the point cloud, and recognizing a shape of the object based on a contour line composed of the extracted valid contour point.

The extracting of the valid contour point of the object may include extracting a plurality of sample points from the point cloud, primarily extracting a contour point from the plurality of sample points based on a distance between the autonomous vehicle and each sample point, secondarily extracting a contour point from the plurality of sample points based on a distance between contour points, and removing a contour point having low validity among all contour points.

The extracting of the plurality of sample points may include setting a location of the autonomous vehicle as an origin, setting a horizontal line passing through the origin to 0°, dividing the point cloud into areas of a first reference angle interval, and extracting a point located closest to the origin as a sample point of a corresponding area.

The primary extracting of the contour point may include extracting a start point and an end point of the sample points, generating a first segment connecting the start point and a second sample point located at two sides of a first sample point, generating a second segment connecting the origin and the first sample point, generating an intersection of the first segment and the second segment, and extracting the first sample point as the contour point when a length of the second segment does not exceed a length of a segment connecting the origin and the intersection.

The secondary extracting of the contour point may include determining a reference distance point as a reference point when a distance between a first contour point and a second contour point exceeds a reference distance, extracting a sample point located within the reference distance from the reference point as a contour point, extracting a sample point located closest to the reference point as a contour point when a plurality of sample points are located within the reference distance from the reference point, and extracting a sample point located closest to the second contour point as a contour point when any sample points located within the reference distance from the reference point does not exist.

The removing of the contour point having low validity may include excluding the first contour point and a last contour point among all the contour points from removal targets, and removing a contour point whose distance from a previous contour point does not exceed a minimum distance, as primary filtering.

The removing of the contour point having low validity may include removing an end point of a segment among segments sequentially connecting the primarily filtered contour points, wherein the removed segment has a length within a reference distance, and an angle between the removed segment and a reference segment connecting a first contour point and a last contour point does not exceed a second reference angle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
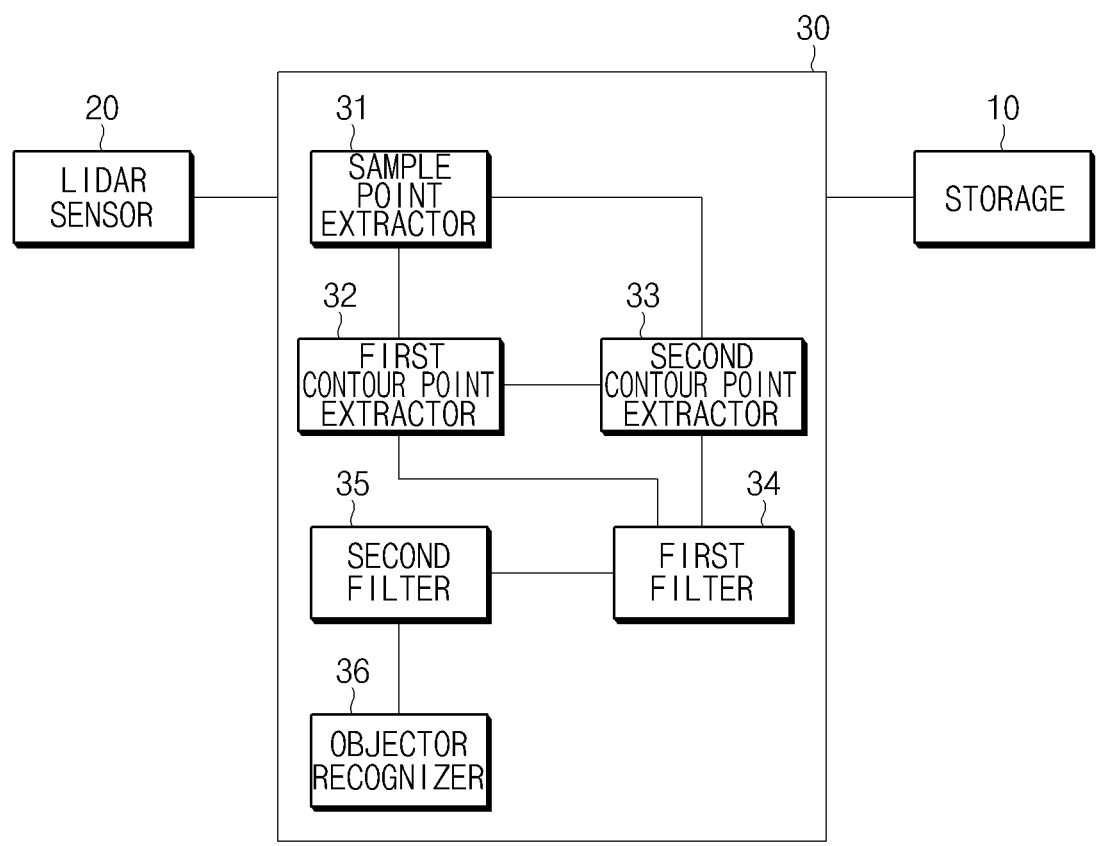
FIG. 1 is a block diagram illustrating a configuration of an apparatus for recognizing an object based on a lidar sensor according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for recognizing an object based on a lidar sensor according to an embodiment of the present disclosure.

As shown in FIG. 1, an apparatus for recognizing an object based on a lidar sensor according to an embodiment of the present disclosure may include storage 10, a lidar sensor 20, and a controller 30. In this case, according to a scheme of implementing the apparatus for recognizing the object based on the lidar sensor according to an embodiment of the present disclosure, each component may be combined with each other, and some components optionally may be omitted.

The storage 10 may store various logic, algorithms and programs required in the processes of extracting a valid contour point of an object from a point cloud generated by the lidar sensor 20, and recognizing a shape of the object based on a contour line consisting of the extracted valid contour point of the object.

The storage 10 may store a first reference angle value (e.g., 0.25°) used to extract a sample point from a point cloud.

The storage 10 may store a convex hull algorithm used to extract a first contour point. In this case, the convex hull algorithm is well known in the art.

The storage 10 may store a reference distance value (e.g., 3 m) used to extract a second contour point or a valid contour point.

The storage 10 may store the minimum distance value (e.g., 0.5 m) used to primarily remove (primary filtering) a contour point having low validity among all contour points (which refer to the contour point extracted by a first contour point extractor 32 and the contour point extracted by a second contour point extractor 33).

The storage 10 may store a second reference angle value (e.g., 10°) used to secondarily remove (secondary filtering) a contour point having low validity among the contour points (which remain after contour points having the low validity are primarily removed from all the contour points) which are primarily filtered by a first filter 34.

The storage 10 may store a reference number (e.g., 30) of valid contour points.

When the number of valid contour points as a result of the second filtering exceeds the reference number, the storage 10 repeatedly performs the second filtering while doubling the second reference angle value each time. In this case the storage 10 may store the maximum reference angle value (e.g., 80°) as a value for limiting the number of iterations of the secondary filtering.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The lidar sensor 20 is mounted on an autonomous vehicle to generate a point cloud for surrounding objects.

The control unit 30 performs overall control such that each of the components can perform its function normally. The controller 30 may be implemented in the form of hardware or software, or may be implemented in the form of a combination of hardware and software. Preferably, the controller 30 may be implemented with a microprocessor, but is not limited thereto.

In particular, the controller 30 may perform various controls in the operations of extracting the valid contour point of an object from the point cloud generated by the lidar sensor 20 and recognizing a shape of the object based on a contour line consisting of the extracted valid contour points of the object.

The controller 30, which is a functional block, may include a sample point extractor 31, a first contour point extractor 32, a second contour point extractor 33, the first filter 34, a second filter 35, and an object recognizer 36.

Hereinafter, details of the controller 30 will be described with reference to FIGS. 2A to 6. In addition, although a very limited number of point clouds are described as an example to aid understanding, the embodiments are not limited thereto.

Figure 2A:
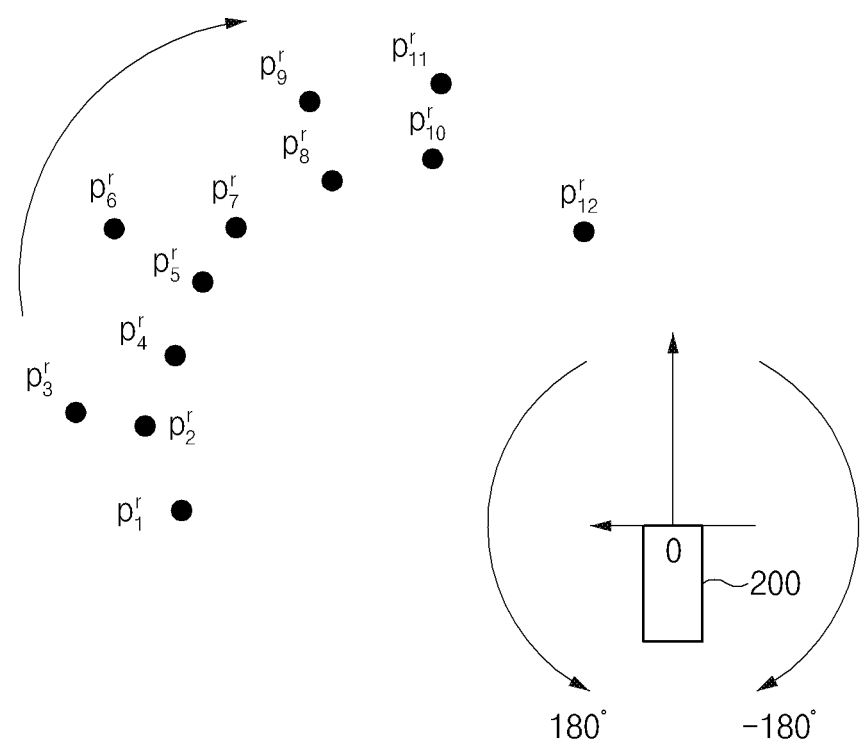
FIGS. 2A to 2C are views illustrating an operation of extracting a sample point from a point cloud by a sample point extractor provided in an apparatus for recognizing an object based on a lidar sensor according to an embodiment of the present disclosure.
Figure 2B:
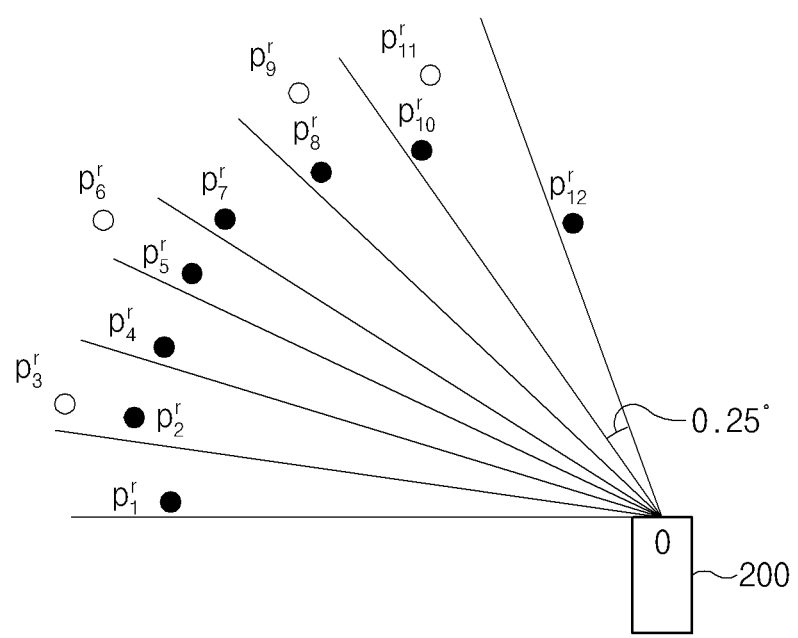
Figure 2C:
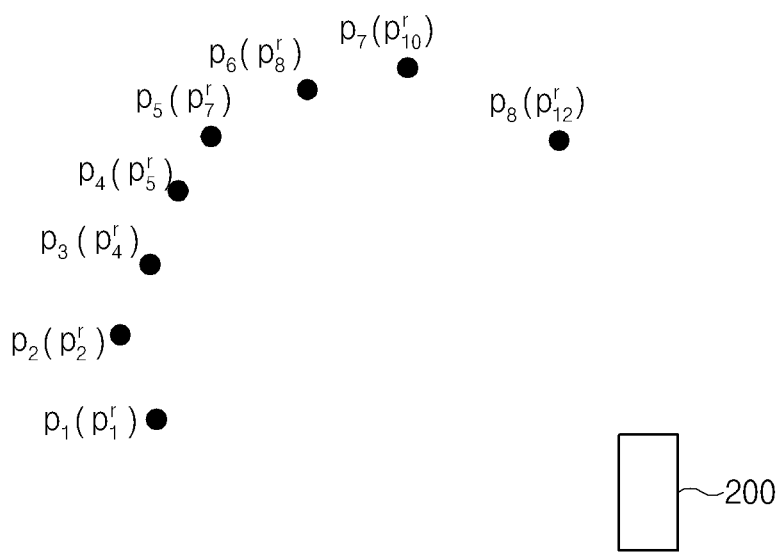

FIGS. 2A to 2C are views illustrating an operation of extracting a sample point from a point cloud by a sample point extractor provided in an apparatus for recognizing an object based on a lidar sensor according to an embodiment of the present disclosure.

FIG. 2A illustrates a clustering result for a point cloud generated by the lidar sensor 20. Clustered points $p_1{}^r \sim p_{12}{}^r$ may be regarded as construction of one object. In addition, reference numeral 200 denotes an autonomous vehicle equipped with an apparatus for recognizing an object according to an embodiment of the present disclosure. A portion (e.g., the center of the front) of the autonomous vehicle 200 is taken as the origin "0", and a horizontal line passing through the origin "0" may be set to 0°.

FIG. 2B illustrates a result of dividing a point cloud into an area of a first reference angle (e.g., 0.25°) interval to enable the sample point extractor 31 to extract a sample point. The sample point extractor 31 may extract a point located closest to the autonomous vehicle 200 for each area as a sample point of the corresponding area.

As an example, point $p_1{}^r$ is selected as a sample point because no other point exists in the area including point $p_1{}^r$, and in the area including points $p_2{}^r$ and $p_3{}^r$, and point $p_2{}^r$ located closer to the autonomous vehicle 200 is selected as a sample point.

FIG. 2C illustrates sample points $p_1$ to $p_8$ extracted by the sample point extractor 31.

Figure 3A:
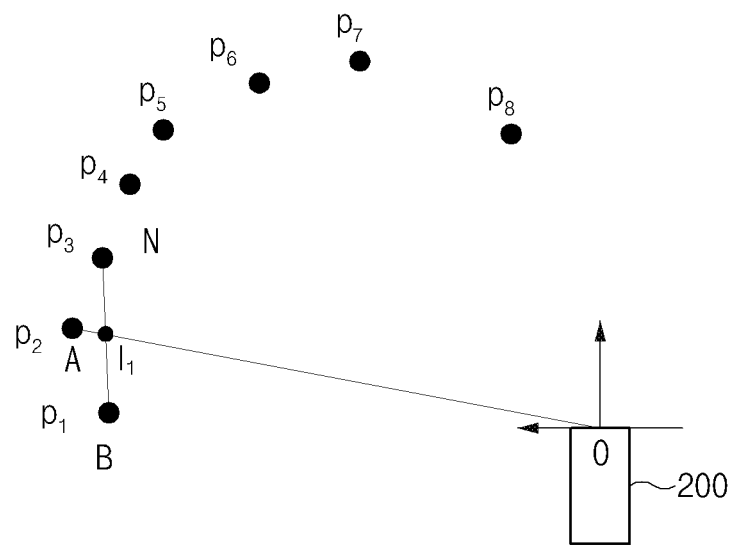
FIGS. 3A to 3C are views illustrating an operation of extracting a first contour point by a first contour point extractor provided in an apparatus for recognizing an object based on a lidar sensor according to an embodiment of the present disclosure.
Figure 3B:
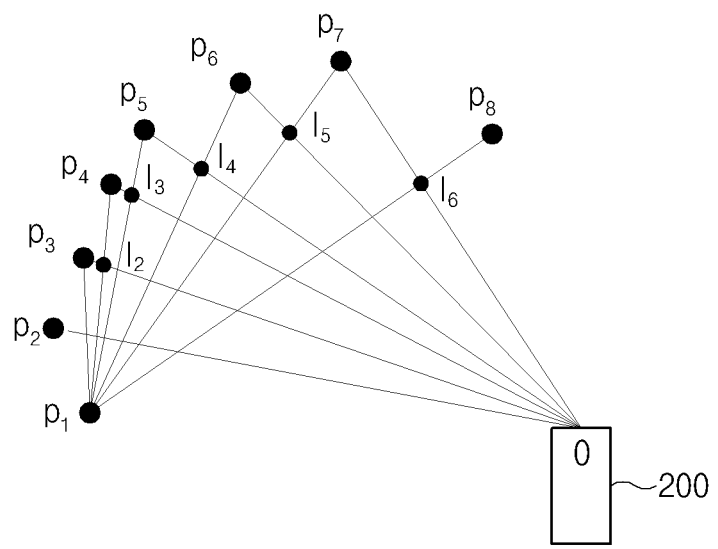
Figure 3C:
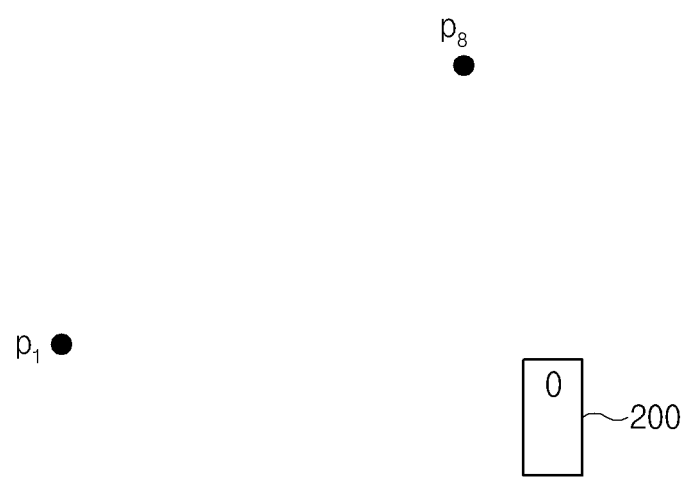

FIGS. 3A to 3C are views illustrating an operation of extracting a first contour point by a first contour point extractor provided in an apparatus for recognizing an object based on a lidar sensor according to an embodiment of the present disclosure.

The first contour point extractor 32 may extract the first contour point based on a convex hull algorithm. Hereinafter, an operation of extracting the first contour point from sample points p1 to p8 extracted by the sample point extractor 31 will be described.

As illustrated in FIG. 3A, the first contour point extractor 32 may extract a plurality of first contour points from sample points $p_1$ to $p_8$ extracted by the sample point extractor 31. In this case, the first contour point extractor 32 may basically extract the start point $p_1$ and the end point $p_8$ as the first contour point, and the remaining points $p_2$ to $p_7$ may be extracted as the first contour point through the following operations.

As an example, an operation of determining whether to extract the $p_2$ point as the first contour point will be described. The first contour point extractor 32 draws a segment $\overline{BN}$ connecting point $p_1$ (B) and point $p_3$ (N) located on both sides of point $p_2$ (A), and a segment $\overline{OA}$ connecting origin "O" and point $p_2$ (A). In this case, the intersection of the segments $\overline{BN}$ and $\overline{OA}$ is called $l_1$.

Then, when the length of the segment $\overline{OA}$ connecting origin "O" and point $p_2$ (A) exceeds the length of the segment connecting the origin "O" and the intersection $l_1$, the first contour point extractor 32 does not extract the point $p_2$ (A) as the first contour point and extracts the point $p_2$ (A) as the first contour point when not exceeded.

Therefore, the first contour point extractor 32 does not extract the point $p_2$ (A) as the first contour point. Because the point $p_2$ (A) is not extracted as the first contour point, points located at both sides of the point $p_3$ are the points $p_1$ and $p_4$ in the operation of determining whether to extract the point $p_3$ as the first contour point. Of course, when the point $p_2$ (A) is extracted as the first contour point, the points located on both sides of the point $p_3$ are the points $p_2$ and $p_4$.

FIG. 3B illustrates an operation of determining whether to extract the remaining points $p_3$ to $p_7$ as the first contour point except for the end point $p_8$ in the manner described above.

As illustrated in FIG. 3B, because the remaining points $p_3$ to $p_7$ also do not meet the above-described condition, the first contour point extractor 32 does not extract all the points $p_2$ to $p_7$ except for the start point $p_1$ and the end point $p_8$ as the first contour point. The result is illustrated in FIG. 3C.

When the contour point of an object is expressed as only the start point $p_1$ and the end point $p_8$, the shape of the object cannot be clearly represented. Therefore, the second contour extractor 33 may be provided to compensate for this.

FIGS. 4A to 4D are views illustrating an operation of extracting a second contour point by a second contour point extractor provided in an apparatus for recognizing an object based on a lidar sensor according to an embodiment of the present disclosure.

Figure 4A:
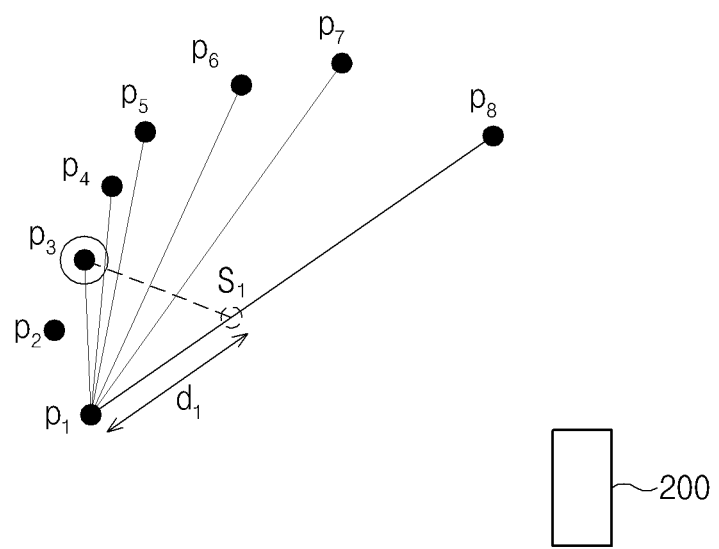
FIGS. 4A to 4D are views illustrating an operation of extracting a second contour point by a second contour point extractor provided in an apparatus for recognizing an object based on a lidar sensor according to an embodiment of the present disclosure.

FIG. 4A illustrates sample points $p_1$ to $p_8$ extracted by the sample point extractor 31, of which points $p_1$ and $p_8$ are a first contour point extracted by the first contour point extractor 32. In addition, di denotes a reference distance (e.g., 3 m).

In general, when the distance between points $p_1$ and $p_8$ is long, because the shape of an object cannot be accurately represented, the second contour point extractor 33 may additionally extract a second contour point from sample points $p_1$ to $p_8$ extracted by the sample point extractor 31.

As illustrated in FIG. 4A, the second contour point extractor 33 draws a segment connecting points $p_1$ and $p_8$, and determines point $s_1$ located at the reference distance on the segment in a direction from point $p_1$ to point $p_8$.

Then, the second contour point extractor 33 may extract, as the second contour point, sample point $p_3$ from the sample points located within the reference distance (e.g., 3 m) from point $s_1$, which is located closest to point $s_1$.

Figure 4B:
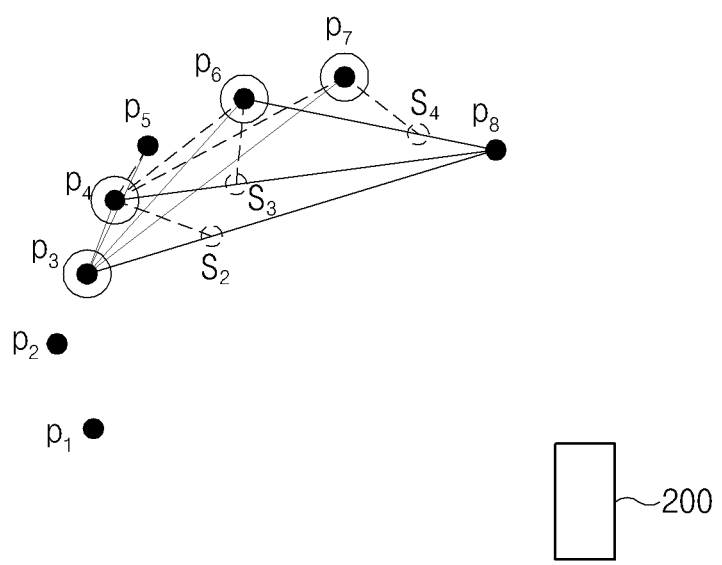

Then, as shown in FIG. 4B, the second contour point extractor 33 draws a segment connecting points $p_3$ and $p_8$, and determines point $s_2$ located at the reference distance on the segment from point $p_3$ to point $p_8$.

Then, the second contour point extractor 33 may extract, as the second contour point, sample point $p_4$ from the sample points located within the reference distance from point $s_2$, which is located closest to point $s_2$.

Then, the second contour point extractor 33 draws a segment connecting points $p_4$ and $p_8$, and determines point $s_3$ located at the reference distance on the segment from point $p_4$ to point $p_8$.

Then, the second contour point extractor 33 may extract, as the second contour point, sample point $p_6$ from the sample points located within the reference distance from point $s_3$, which is located closest to point $s_3$.

Then, the second contour point extractor 33 draws a segment connecting points $p_6$ and $p_8$, and determines point $s_4$ located at the reference distance on the segment from point $p_6$ to point $p_8$.

Then, the second contour point extractor 33 may extract, as the second contour point, sample point $p_7$ from the sample points located within the reference distance from point $s_4$, which is located closest to point $s_4$.

Figure 4C:
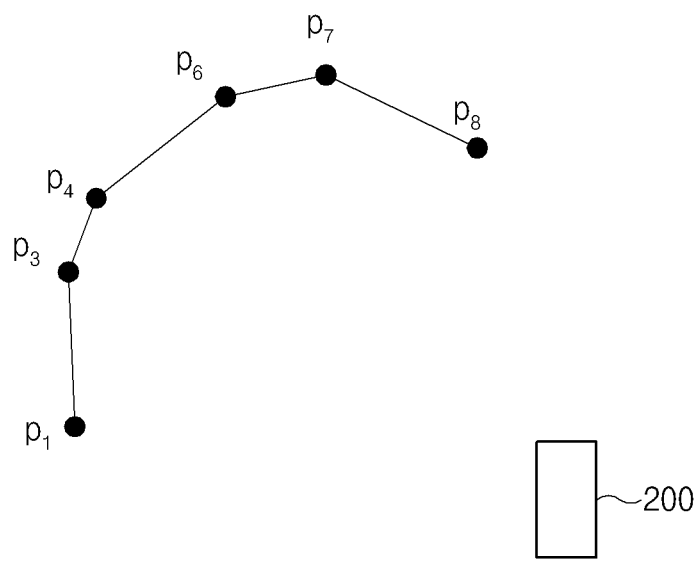
Figure 4D:
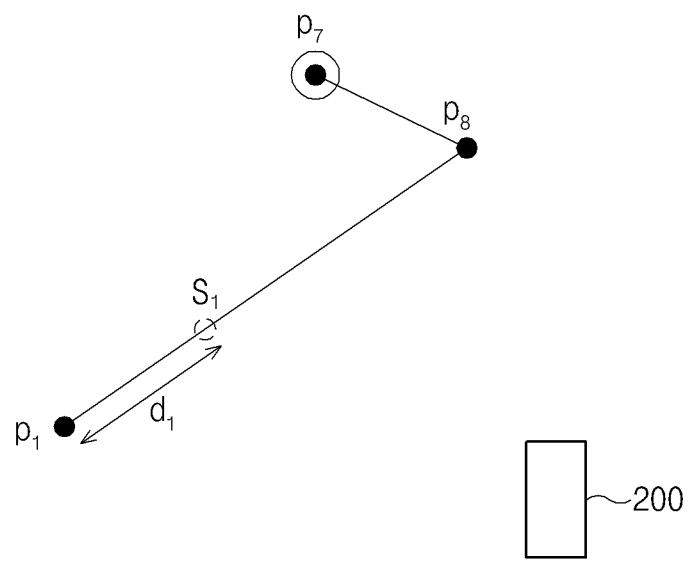

The extracted second contour points are points $p_3$, $p_4$, $p_6$, and $p_7$, and the entire contour points $p_1$, $p_3$, $p_4$, $p_6$, $p_7$, and $p_8$ collectively referring to the first and second contour points are illustrated in FIG. 4C.

Meanwhile, when there are no sample points located within the reference distance from point $s_1$, as shown in FIG.

4D, the second contour point extractor 33 extracts, as the second contour point, sample point $p_7$ located closest to point $p_8$. In this case, the total contour points are $p_1$, $p_7$ and $p_8$.

Figure 5:
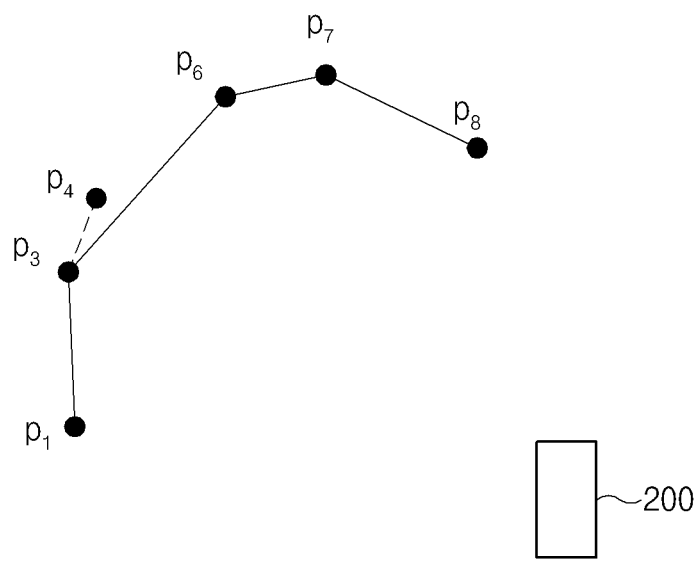
FIG. 5 is a view illustrating an operation of removing (primary filtering) a contour point having low validity among all the contour points by a first filter provided in an apparatus for recognizing an object based on a lidar sensor according to an embodiment of the present disclosure.

FIG. 5 is a view illustrating an operation of removing (primary filtering) a contour point having low validity among all the contour points by a first filter provided in an apparatus for recognizing an object based on a lidar sensor according to an embodiment of the present disclosure.

In FIG. 5, p1, p3, p4, p6, p7, and p8 represent entire contour points. The first filter 34 removes the contour points whose distance to the previous contour point does not exceed the minimum distance among the entire contour points.

As shown in FIG. 5, because the distance (dotted line) from contour point $p_3$ to contour point $p_4$ does not exceed the minimum distance, it may be understood that contour point $p_4$ is removed. Therefore, the contour line is directly connected from contour point $p_3$ to contour point $p_6$.

Figure 6:
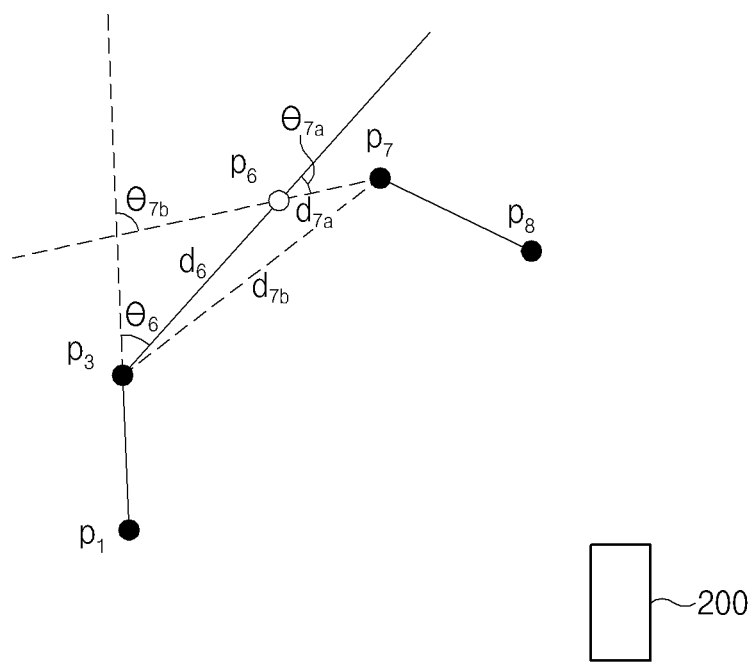
FIG. 6 is a view illustrating an operation of removing (secondary filtering) a contour point having low validity in the first filtering result by a second filter provided in an apparatus for recognizing an object based on a lidar sensor according to an embodiment of the present disclosure.

FIG. 6 is a view illustrating an operation of removing (secondary filtering) a contour point having low validity in the first filtering result by a second filter provided in an apparatus for recognizing an object based on a lidar sensor according to an embodiment of the present disclosure.

In FIG. 6, contour points $p_1$, $p_3$, $p_6$, $p_7$, and $p_8$ are the first filtering result by the first filter 34.

In addition, the distance between contour points $p_3$ and $p_6$ is denoted as $d_6$, the distance between contour points $p_6$ and $p_7$ is denoted as $d_{7a}$, the distance between contour points $p_3$ and $p_7$ is denoted as $d_{7b}$, the angle between the segment connecting contour points $p_1$ and $p_3$ and the segment connecting $p_3$ and $p_6$ is denoted as $\theta_6$, the angle between the segment connecting contour points $p_3$ and $p_6$ and the segment connecting $p_6$ and $p_7$ is denoted as $\theta_{7a}$, and the angle between the segment connecting contour points $p_1$ and $p_3$ and the segment connecting $p_6$ and $p_7$ is denoted as $\theta_{7b}$.

Hereinafter, a process of determining whether the second filter 35 removes the p6 contour point will be described. In this case, because the line segment connecting the p1 contour point and the p3 contour point becomes a reference line segment, the p3 contour point is excluded from removal.

1) When $d_6$ exceeds the reference distance, contour point $p_6$ is not removed.

2-1) When $d_6$ does not exceed the reference distance and $\theta_6$ exceeds the second reference angle, contour point $p_6$ is not removed.

2-2) When $d_6$ does not exceed the reference distance and $\theta_6$ does not exceed the second reference angle, contour point $p_6$ is removed.

3) When contour point $p_6$ is removed, the reference segment (the segment connecting contour point $p_1$ and contour point $p_3$) is maintained, and when contour point $p_6$ is not removed, the segment connecting contour point $p_3$ and contour point $p_6$ becomes a new reference segment.

Hereinafter, a process of determining whether the second filter 35 removes contour point $p_7$ will be described. In this case, because whether to remove contour point $p_7$ depends on the state of contour point $p_6$, the case where contour point $p_6$ is not removed and the case where contour point $p_6$ is removed will be described separately.

[Case in which Contour Point $p_6$ is not Removed]
1) The segment connecting contour points $p_3$ and $p_6$ is a new reference segment.

2-1) When $d_{7a}$ exceeds the reference distance, contour point $p_6$ is not removed.

2-2) When $d_{7a}$ does not exceed the reference distance and $\theta_{7a}$ exceeds the second reference angle, contour point $p_7$ is not removed.

2-3) When $d_{7a}$ does not exceed the reference distance and $\theta_{7a}$ does not exceed the second reference angle, contour point $p_7$ is removed.

[Case in which Contour Point $p_6$ is Removed]
1) The current reference segment is maintained.

2-1) When $d_{7b}$ exceeds the reference distance, contour point $p_6$ previously removed is revived.

2-2) The subsequent process is the same as [the case in which contour point $p_6$ is not removed].

3-1) When $d_{7b}$ does not exceed the reference distance and $\theta_{7b}$ exceeds the second reference angle, contour point $p_7$ is not removed.

3-2) When $d_{7b}$ does not exceed the reference distance and $\theta_{7b}$ does not exceed the second reference angle, contour point $p_7$ is removed.

Through the above-described process, the last remaining valid contour points become $p_1$, $p_3$, $p_7$, and $p_8$. In this case, contour point $p_6$ was removed.

In an embodiment of the present disclosure, a small number of contour points $p_1$, $p_3$, $p_6$, $p_7$, and $p_8$ have been described as an example, but it is possible to remove contour points having low validity regardless of the number of contour points by applying the above-described scheme.

Meanwhile, when the number of valid contour points does not exceed the reference number, the object recognizer 36 recognizes the shape of an object based on the contour line connecting the valid contour points.

When the number of valid contour points exceeds the reference number, the object recognizer 36 repeats the second filtering process and reduces the number of valid contour points by doubling the second reference angle value each time.

As described above, the detailed configuration of the controller 30 has been described, and all functions of the detailed configuration may be performed by the controller 30.

Figure 7:
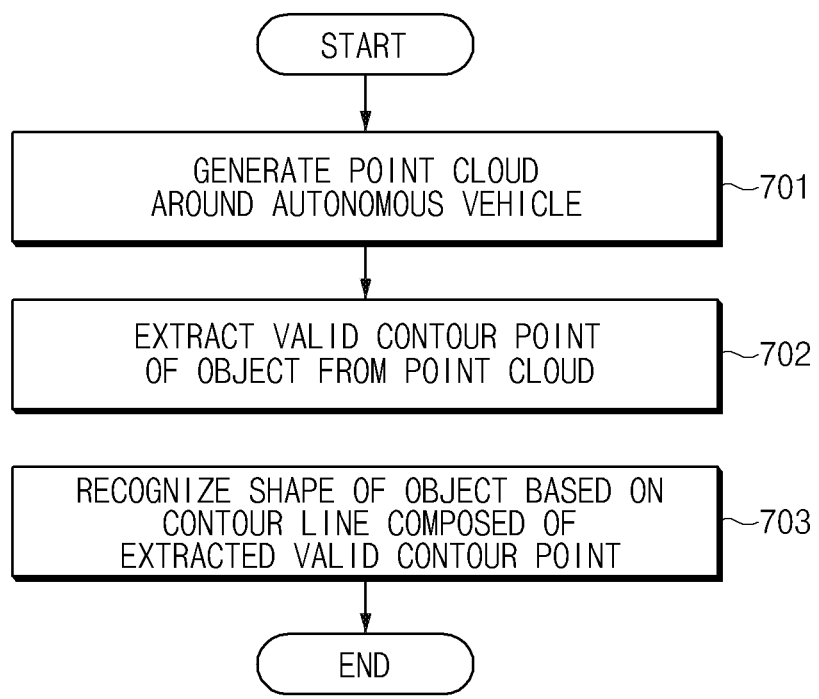
FIG. 7 is a flowchart illustrating a method of recognizing an object based on a lidar sensor according to an embodiment of the present disclosure.

FIG. 7 is a flowchart illustrating a method of recognizing an object based on a lidar sensor according to an embodiment of the present disclosure.

First, in operation 701, the lidar sensor 20 generates a point cloud around an autonomous vehicle.

Then, in operation 702, the controller 30 extracts a valid contour point of an object from the point cloud generated by the lidar sensor 20. In this case, the controller 30 may further perform a process of clustering the point cloud based on a technique well-known in the art.

Then, in operation 703, the controller 30 recognizes the shape of the object based on the contour line consisting of the extracted valid contour points.

Figure 8:
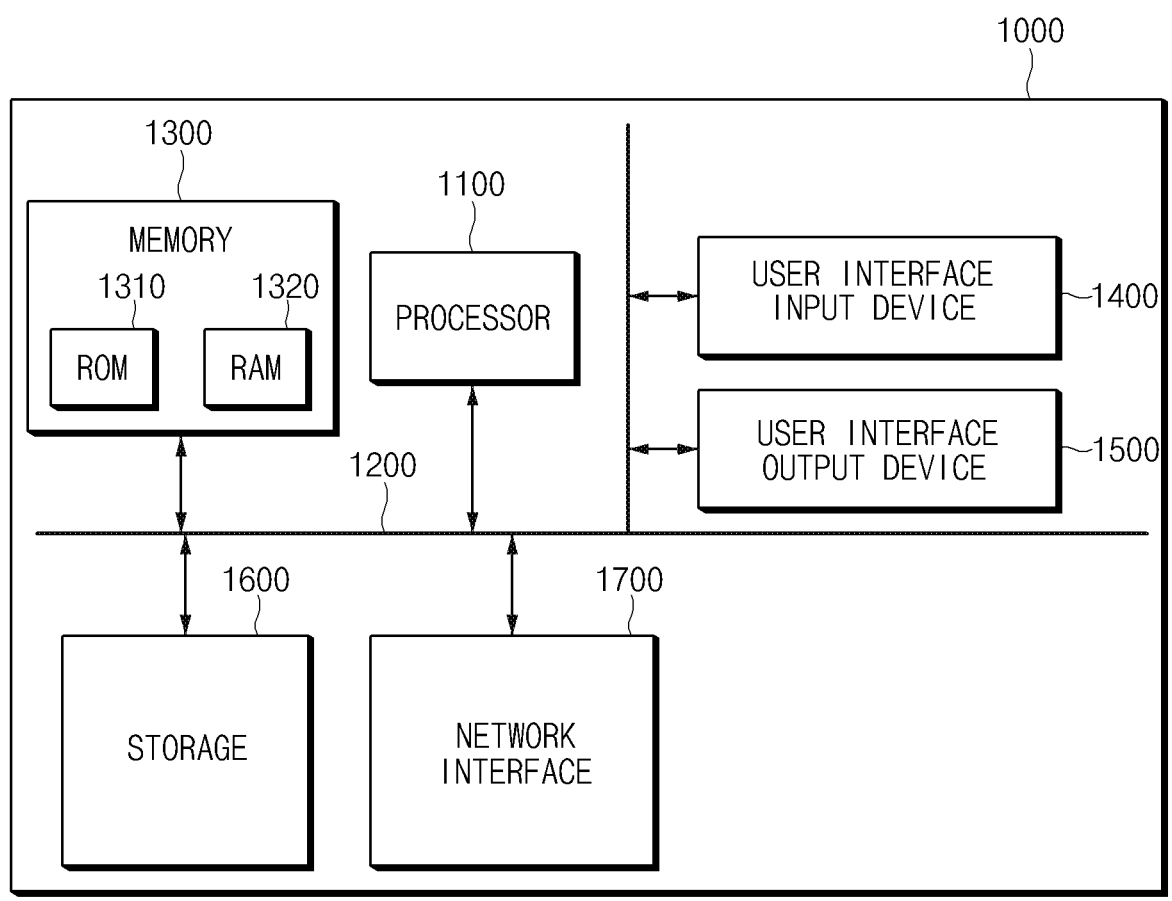
FIG. 8 is a block diagram illustrating a computing system for executing a method of recognizing an object based on a lidar sensor according to an embodiment of the present disclosure.

FIG. 8 is a block diagram illustrating a computing system for executing a method of recognizing an object based on a lidar sensor according to an embodiment of the present disclosure.

Referring to FIG. 8, as described above, a method of recognizing an object based on a lidar sensor according to an embodiment of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600.

The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, an apparatus for recognizing an object based on a lidar sensor and a method thereof can extract an valid contour point of an object from a point cloud generated by the lidar sensor and recognize the shape of the object based on a contour line consisting of the extracted valid contour point of the object, such that it is possible to recognize the shape of an object located on a road with high accuracy, thereby improving the driving stability of an autonomous vehicle.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for recognizing an object based on a light detection and ranging (lidar) sensor, the apparatus comprising:
   the lidar sensor configured to generate a point cloud around an autonomous vehicle; and
   a controller configured to:
   extract a valid contour point of the object from the point cloud;
   recognize a shape of the object based on a contour line composed of the extracted valid contour point;
   set a location of the autonomous vehicle as an origin;
   set a horizontal line passing through the origin to 0°;
   divide the point cloud into areas of a first reference angle interval;
   for each area, extract a point from the point cloud located closest to the origin as a sample point of the corresponding area; and
   extract a contour point of the object from the extracted sample points based on a distance between the origin and each sample point.

2. The apparatus of claim 1, wherein the controller is configured to extract a start point and an end point of the sample points as contour points, generate a first segment connecting the start point and a second sample point located at two sides of a first sample point, generate a second segment connecting the origin and the first sample point, generate an intersection of the first segment and the second segment, and extract the first sample point as the contour point when a length of the second segment does not exceed a length of a segment connecting the origin and the intersection.

3. The apparatus of claim 2, wherein the controller is configured to set the sample points located at two sides of the second sample point as the first sample point and a third sample point when the first sample point is extracted as the contour point, and set sample points located on both sides of the second sample point as the start point and the third sample point when the first sample point is not extracted as a contour point, when determining whether to extract the contour point of the second sample point.

4. The apparatus of claim 1, wherein the controller is configured to extract the contour point from the sample points based on a distance between the sample points.

5. The apparatus of claim 4, wherein the controller is configured to determine a reference distance point as a reference point and extract a sample point located within a reference distance from the reference point as a contour point when a distance between a first contour point and a second contour point exceeds the reference distance.

6. The apparatus of claim 5, wherein the controller is configured to extract a sample point located closest to the reference point as the contour point when a plurality of sample points is located within the reference distance from the reference point.

7. The apparatus of claim 5, wherein the controller is configured to extract a sample point located closest to the second contour point as the contour point when any sample point located within the reference distance from the reference point does not exist.

8. The apparatus of claim 4, wherein the controller is configured to remove the contour point having low validity among all contour points.

9. The apparatus of claim 8, wherein the controller is configured to exclude the first contour point and a last contour point among all the contour points from removal targets, and remove a contour point whose distance from a previous contour point does not exceed a minimum distance, as primary filtering.

10. The apparatus of claim 9, wherein the controller is configured to remove an end point of a segment among segments sequentially connecting the primarily filtered contour points as secondary filtering, and wherein the removed segment has a length within a reference distance, and an angle between the removed segment and a reference segment connecting a first contour point and a last contour point does not exceed a second reference angle.

11. The apparatus of claim 10, wherein the controller repeatedly performs the secondary filtering while increasing the second reference angle each time when a number of valid contour points as a result of the secondary filtering exceeds a reference number.

12. A method of recognizing an object based on a light detection and ranging (lidar) sensor, the method comprising:
   generating, by the lidar sensor, a point cloud around an autonomous vehicle;
   extracting, by a controller, a valid contour point of the object from the point cloud; and recognizing a shape of the object based on a contour line composed of the extracted valid contour point,
wherein extracting the valid contour point of the object includes:
  extracting a plurality of sample points from the point cloud;
  primarily extracting a contour point from the plurality of sample points based on a distance between the autonomous vehicle and each sample point;
  secondarily extracting a contour point from the plurality of sample points based on a distance between contour points; and
  removing a contour point having low validity among the contour points,
wherein extracting the plurality of sample points includes:
  setting a location of the autonomous vehicle as an origin;
  setting a horizontal line passing through the origin to 0°;
  dividing the point cloud into areas of a first reference angle interval; and
  for each area, extracting a point located closest to the origin as a sample point of the corresponding area.

13. A method of recognizing an object based on a light detection and ranging (lidar) sensor, the method comprising:
  generating, by the lidar sensor, a point cloud around an autonomous vehicle;
  extracting, by a controller, a valid contour point of the object from the point cloud; and
  recognizing a shape of the object based on a contour line composed of the extracted valid contour point;
  wherein extracting the valid contour point of the object includes:
    extracting a plurality of sample points from the point cloud;
    primarily extracting a contour point from the plurality of sample points based on a distance between the autonomous vehicle and each sample point;
    secondarily extracting a contour point from the plurality of sample points based on a distance between contour points; and
    removing a contour point having low validity among the contour points,
  wherein primary extracting the contour point includes:
    extracting a start point and an end point of the sample points;
    generating a first segment connecting the start point and a second sample point located at two sides of a first sample point;
    generating a second segment connecting the origin and the first sample point;
    generating an intersection of the first segment and the second segment; and
    extracting the first sample point as the contour point when a length of the second segment does not exceed a length of a segment connecting the origin and the intersection.

14. A method of recognizing an object based on a light detection and ranging (lidar) sensor, the method comprising:
  generating, by the lidar sensor, a point cloud around an autonomous vehicle;
  extracting, by a controller, a valid contour point of the object from the point cloud; and
  recognizing a shape of the object based on a contour line composed of the extracted valid contour point;
  wherein extracting the valid contour point of the object includes:
    extracting a plurality of sample points from the point cloud;
    primarily extracting a contour point from the plurality of sample points based on a distance between the autonomous vehicle and each sample point;
    secondarily extracting a contour point from the plurality of sample points based on a distance between contour points; and
    removing a contour point having low validity among the contour points;
  wherein secondarily extracting the contour point includes:
    determining a reference distance point as a reference point when a distance between a first contour point and a second contour point exceeds a reference distance;
    extracting a sample point located within the reference distance from the reference point as a contour point;
    extracting a sample point located closest to the reference point as a contour point when a plurality of sample points is located within the reference distance from the reference point; and
  extracting a sample point located closest to the second contour point as a contour point when any sample point located within the reference distance from the reference point does not exist.

15. A method of recognizing an object based on a light detection and ranging (lidar) sensor, the method comprising:
  generating, by the lidar sensor, a point cloud around an autonomous vehicle;
  extracting, by a controller, a valid contour point of the object from the point cloud; and
  recognizing a shape of the object based on a contour line composed of the extracted valid contour point;
  wherein extracting the valid contour point of the object includes:
    extracting a plurality of sample points from the point cloud;
    primarily extracting a contour point from the plurality of sample points based on a distance between the autonomous vehicle and each sample point;
    secondarily extracting a contour point from the plurality of sample points based on a distance between contour points; and
    removing a contour point having low validity among the contour points;
  wherein removing the contour point having low validity includes:
    excluding the first contour point and a last contour point among all the contour points from removal targets; and
    removing a contour point whose distance from a previous contour point does not exceed a minimum distance, as primary filtering.

16. The method of claim 15, wherein removing the contour point having low validity includes removing an end point of a segment among segments sequentially connecting the primarily filtered contour points, and
  wherein the removed segment has a length within a reference distance, and an angle between the removed segment and a reference segment connecting a first contour point and a last contour point does not exceed a second reference angle.

* * * * *